US006804174B1

(12) United States Patent
Kurita et al.

(10) Patent No.: US 6,804,174 B1
(45) Date of Patent: Oct. 12, 2004

(54) MAGNETO-OPTICAL DISK RECORDING AND/OR REPRODUCING DEVICE

(75) Inventors: Kazuhito Kurita, Kanagawa (JP); Tadami Nakamura, Saitama (JP)

(73) Assignee: Sony Corporation, Tokyo (JP)

(*) Notice: Subject to any disclaimer, the term of this patent is extended or adjusted under 35 U.S.C. 154(b) by 740 days.

(21) Appl. No.: 09/786,743

(22) PCT Filed: Jul. 10, 2000

(86) PCT No.: PCT/JP00/04598

§ 371 (c)(1),
(2), (4) Date: Apr. 5, 2001

(87) PCT Pub. No.: WO01/04898

PCT Pub. Date: Jan. 18, 2001

(30) Foreign Application Priority Data

Jul. 9, 1999 (JP) .......................................... 11-195779

(51) Int. Cl.[7] .......................... G11B 11/00; G11B 33/02
(52) U.S. Cl. ................................... 369/13.12; 369/75.2
(58) Field of Search ............................. 369/13.2, 13.4, 369/13.02, 13.17, 13.11, 13.12, 75.1, 75.2, 77.1, 77.2, 258, 13.21, 256; 360/255.2, 105, 99.02, 99.03, 99.06

(56) References Cited

U.S. PATENT DOCUMENTS

| 6,088,203 A | * | 7/2000 | Nakamura et al. | ....... 360/255.2 |
| 6,515,954 B1 | * | 2/2003 | Nakamura et al. | ......... 369/75.2 |
| 6,728,188 B1 | * | 4/2004 | Nakamura et al. | ......... 369/75.2 |
| 6,741,525 B2 | * | 5/2004 | Kurita et al. | ............ 369/13.12 |

FOREIGN PATENT DOCUMENTS

| JP | 5-342685 | 12/1993 |
| JP | 6-195908 | 7/1994 |
| JP | 7-32754 | 6/1995 |
| JP | 7-141811 | 6/1995 |
| JP | 7-320431 | 12/1995 |
| WO | WO 98/02882 | 1/1998 |

* cited by examiner

*Primary Examiner*—Ali Neyzari
(74) *Attorney, Agent, or Firm*—Oblon, Spivak, McClelland, Maier & Neustadt, P.C.

(57) ABSTRACT

A recording and/or reproducing apparatus for magneto-optical disc includes a head supporting mechanism and a movement mechanism. The head supporting mechanism includes a supporting member disposed above a holder in such a manner to oppose an optical pick-up and provided at one end side with a magnetic head to move the supporting member between recording position at which the magnetic head supplies external magnetic field to the magneto-optical disc held by the holder and non-recording position above the recording position and at which the magnetic head is spaced with respect to the magneto-optical disc. The movement mechanism includes a movement member movably disposed on the side surface of the body unit so that it is moved between first position at which the head supporting mechanism is driven at the time of recording with respect to the magneto-optical disc to move the magnetic head to the recording position and second position at which the head supporting mechanism is driven at the time of reproduction of the magneto-optical disc to move the magnetic head to the non-recording position.

17 Claims, 10 Drawing Sheets

MAGNETO-OPTICAL DISK RECORDING AND/OR REPRODUCING DEVICE

TECHNICAL FIELD

This invention relates to a recording and/or reproducing apparatus for a magneto-optical disc. Specifically, this invention relates to a recording and/or reproducing apparatus for a magneto-optical disc, which is provided with a magnetic head for supplying external magnetic field to the magneto-optical disc.

BACKGROUND ART

In a recording apparatus for magneto-optical disc for carrying out recording of information with respect to the magneto-optical disc, there is required a magnetic head for supplying external magnetic field to the magneto-optical disc caused to be in contact with or become close to the surface of the opposite side of laser beam irradiation surface of the magneto-optical disc.

The magnetic head is spaced from the magneto-optical disc at the time except for the time of recording of the magneto-optical disc, and is caused to be in contact with or become close to the magneto-optical disc only at the time of recording. For this reason, it is necessary to move the magnetic head between the recording position caused to be in contact with or become close to the magneto-optical disc and the non-recording position spaced from the magneto-optical disc.

Figure 1:
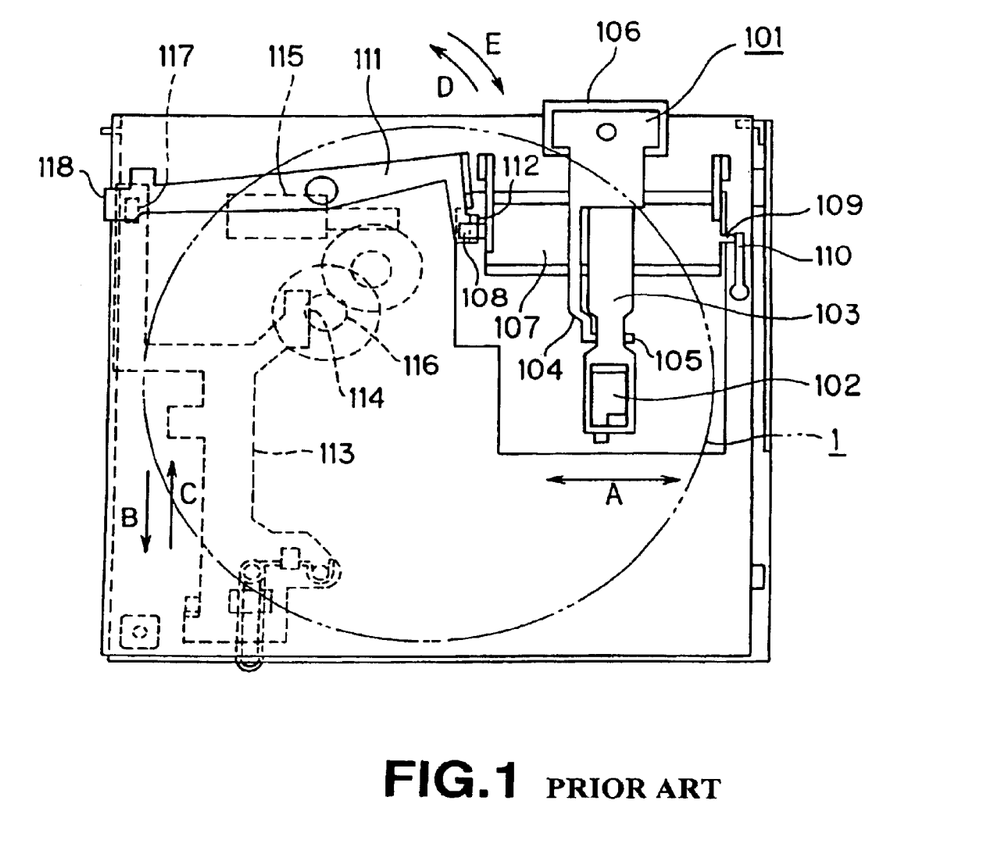
FIG. 1 is a plan view showing outline of the essential part of a conventional recording apparatus for magneto-optical disc.

In the prior art, as mechanism for moving the magnetic head for the above-described object, there is provided a mechanism as shown in FIG. 1.

At a top plate of holder (not shown) for holding disc cartridge adapted so that magneto-optical disc is rotatably accommodated within cartridge case which is a square flat casing and moved between fitting position at which this disc cartridge is fitted at a predetermined disc fitting portion and the eject position at which insertion/withdrawal of the disc cartridge is carried out, there is formed a large hole for facing the upper surface of the disc cartridge toward the upper portion.

As shown in FIG. 1, a magnetic head unit 101 is connected to optical pick-up (not shown) through a connection member 106, and is adapted so that it is moved in left and right directions, i.e., in the direction indicated by arrow A in FIG. 1 together with the optical pick-up.

The magnetic head unit 101 is provided at the front end side thereof with a head supporting arm 103 which supports a magnetic head 102 and an arm supporting plate 104 for regulating excessive displacement of this head supporting arm 103.

The head supporting arm 103 is formed by punching thin metal plate having elasticity, e.g., phosphor bronze, etc. The arm supporting plate 104 is adapted so that a front end portion 105 bent L-shaped supports the lower surface of the front end side of the head supporting arm 103, and bottom end portions of this arm supporting plate 104 and the head supporting arm 103 are both fixed and supported at the upper end portion of the channel-shaped connection member 106.

The magnetic head 102 is upwardly and downwardly moved by a head shift plate 107. The head shift plate 107 takes substantially square plate shape, wherein the back end portion is rotatably supported also in both upper and lower directions in the vicinity of the back end portion of the hole of the holder.

At the head shift plate 107, a driven piece 108 is provided in a projected manner (hereinafter simply referred to as projected as occasion may demand) at one side edge and a spring contact piece 109 is projected at the other side edge.

A return spring 110 consisting of plate spring material is adapted so that one end is fixed at the top plate of the holder and the other end is caused to be in contact with the spring contact piece 109 of the head sift plate 107 from the upper side to downwardly bias the head shift plate 107. The driven piece 108 of the head shift plate 107 is positioned at the upper side of a cam piece 112 of a head vertical movement lever 111 rotatably supported at the top plate of the holder. This cam piece 112 is adapted so that falling portion is formed at the back end portion and rising portion is formed at the front end portion and the portion between these falling and rising portions is connected by slating side portion. The state shown in FIG. 1 indicates the state where the driven piece 108 is mounted on the falling portion of the cam piece 112. In this state, the head shift plate 107 is rotated downwardly. As a result, there results the state where the magnetic head unit 101 is downwardly rotated and the magnetic head 102 is in contact with the magneto-optical disc 1 supported by the holder.

At chassis (not shown) on which the holder is supported, a vertical movement control plate 113 is movably supported in forward and backward directions, i.e., in the direction indicated by arrow B (forward direction) and in the direction indicated by arrow C (backward direction) in the figure. At the vertical movement control plate 113, a rack 114 is formed, and this rack 114 is fed by a pinion 116 rotated by a motor 115 so that it is moved in forward and backward directions. At the vertical movement control plate 113, a connection hole 117 is formed at the back end portion, and a connection piece 118 vertically provided at the other end portion of the head vertical movement lever 111 is inserted through the connection hole 117.

Accordingly, when the vertical movement control plate 113 is moved in the forward direction, i.e., in the direction indicated by arrow B in FIG. 1, the head vertical movement lever 111 is rotated in counterclockwise direction, i.e., in the direction indicated by arrow D in FIG. 1. In addition, when the vertical movement control plate 113 is moved in backward direction, i.e., in the direction indicated by arrow C in FIG. 1, the head vertical movement lever 111 is rotated in the clockwise direction, i.e., in the direction indicated by arrow E in FIG. 1.

As described above, the state shown in FIG. 1 is the state at the time of recording, and the vertical movement control plate 113 is placed in the state where it is moved in the direction indicated by arrow C. Thus, the head vertical movement lever 111 is rotated in the clockwise direction, i.e., in the direction indicated by arrow E and the magnetic head 102 is placed in the state where it is positioned lowermost with respect to the holder. In this state, the magnetic head 102 is in contact with the magneto-optical disc 1.

When recording is completed, the vertical movement control plate 113 is moved in the forward direction, i.e., in the direction indicated by arrow B. Thus, the head vertical movement lever 111 is moved in counterclockwise direction, i.e., in the direction indicated by arrow D. As a result, the cam piece 112 is moved in the backward direction and the driven piece 108 of the head shift plate 107 is placed in the state positioned at rising portion of the cam piece 112. Thus, the head shift plate 107 is rotated in the supper direction, and the arm supporting plate 104 and the head supporting arm 103 are lifted by this head shift plate 107 in such a manner that they are rotated in upper direction. As a result, the magnetic head 102 is spaced from the magneto-optical disc 1.

In the above-described conventional recording apparatus for magneto-optical disc, the head vertical movement lever 111 is interposed between the vertical movement control plate 113 and the head shift plate 107 for the purpose of rotating the head shift plate 107. Thus, the number of parts is large and the connecting portions become many. As a result, in the above-described configuration, there are the problems that there results increased cost, positional accuracy of the connecting portions is difficult to be ensured, transmission efficiency of force is poor and reliability is low. Further, in the recording apparatus for magneto-optical disc shown in FIG. 1, there was the problem that members for transmission of force such as vertical movement control plate 113 extending over substantially in forward and backward directions of chassis, connection piece 118 of head vertical movement lever 111 extending upwardly and downwardly at one side portion and head vertical movement plate 111 extending in left and right directions at the upper surface of the holder must be crept over a long distance, so these members take extra space and there is anxiety in arrangement of other members, etc.

DISCLOSURE OF THE INVENTION

In view of the above, an object of this invention is to provide a recording and/or reproducing apparatus for magneto-optical disc which can realize reduction in cost and improvement in reliability by decrease in the number of parts and simplicity of the mechanism, and increase in space merit.

A recording and/or reproducing apparatus for magneto-optical disc according to this invention proposed in order to attain the object as described above includes a body unit, a holder, a magnetic head, a head supporting mechanism and a movement mechanism. The body unit includes a rotation drive portion for rotationally driving at least magneto-optical disc, and an optical pick-up for irradiating laser beams onto the magneto-optical disc rotated by the rotation drive portion. The holder is moved between upper position at which the magneto-optical disc is inserted and lower position at which the inserted magneto-optical disc is held to fit it at the rotation drive portion. The magnetic head supplies external magnetic field to the magneto-optical disc. The head movement mechanism includes a supporting member disposed above the holder in such a manner to oppose the optical pick-up, and provided at one end side with the magnetic head to move this supporting member between recording position at which the magnetic head supplies external magnetic field to the magneto-optical disc held by the holder and non-recording position above the recording position and at which the magnetic head is spaced with respect to the magneto-optical disc. The movement mechanism includes a movement member movably disposed at the side surface of the body unit so that it is moved between a first position at which the head supporting mechanism is driven at the time of recording with respect to the magneto-optical disc to move the magnetic head to the recording position and second position at which the head supporting mechanism is driven at the time of reproduction of the magneto-optical disc to move the magnetic head to the non-recording position.

Further, the recording and/or reproducing apparatus for magneto-optical disc according to this invention includes a body unit, a holder, a magnetic head, a head supporting mechanism and a movement mechanism. The body unit includes a rotation drive portion for rotationally driving at least magneto-optical disc, and an optical pickup for irradiating laser beams onto the magneto-optical disc rotated by the rotation drive portion. The holder is rotatably provided with respect to the body unit between upper position at which the magneto-optical disc is inserted and lower position at which the inserted magneto-optical disc is held to fit it at the rotation drive portion. The magnetic head supplies external magnetic field to the magneto-optical disc. The head supporting mechanism includes a supporting member disposed above the holder in such a manner to oppose the optical pick-up and provided at one end side with the magnetic head to move this supporting member between recording position at which the magnetic head supplies external magnetic field to the magneto-optical disc held by the holder and non-recording position above the recording position and at which the magnetic head is spaced with respect to the magneto-optical disc.

The movement mechanism includes a movement member movably disposed at the side surface of the body unit so that it is moved between first position at which the head supporting mechanism is driven at the time of recording with respect to the magneto-optical disc to move the magnetic head to recording position and second position at which the head supporting mechanism is driven when the holder is moved toward the upper position to move the magnetic head to non-recording position.

Still further objects of this invention and more practical merits obtained by this invention will become more apparent from the description of the embodiment which will be explained.

BEST MODE FOR CARRYING OUT THE INVENTION

A recording and/or reproducing apparatus for magneto-optical disc according to this invention will now be described in more practical sense.

Figure 3:
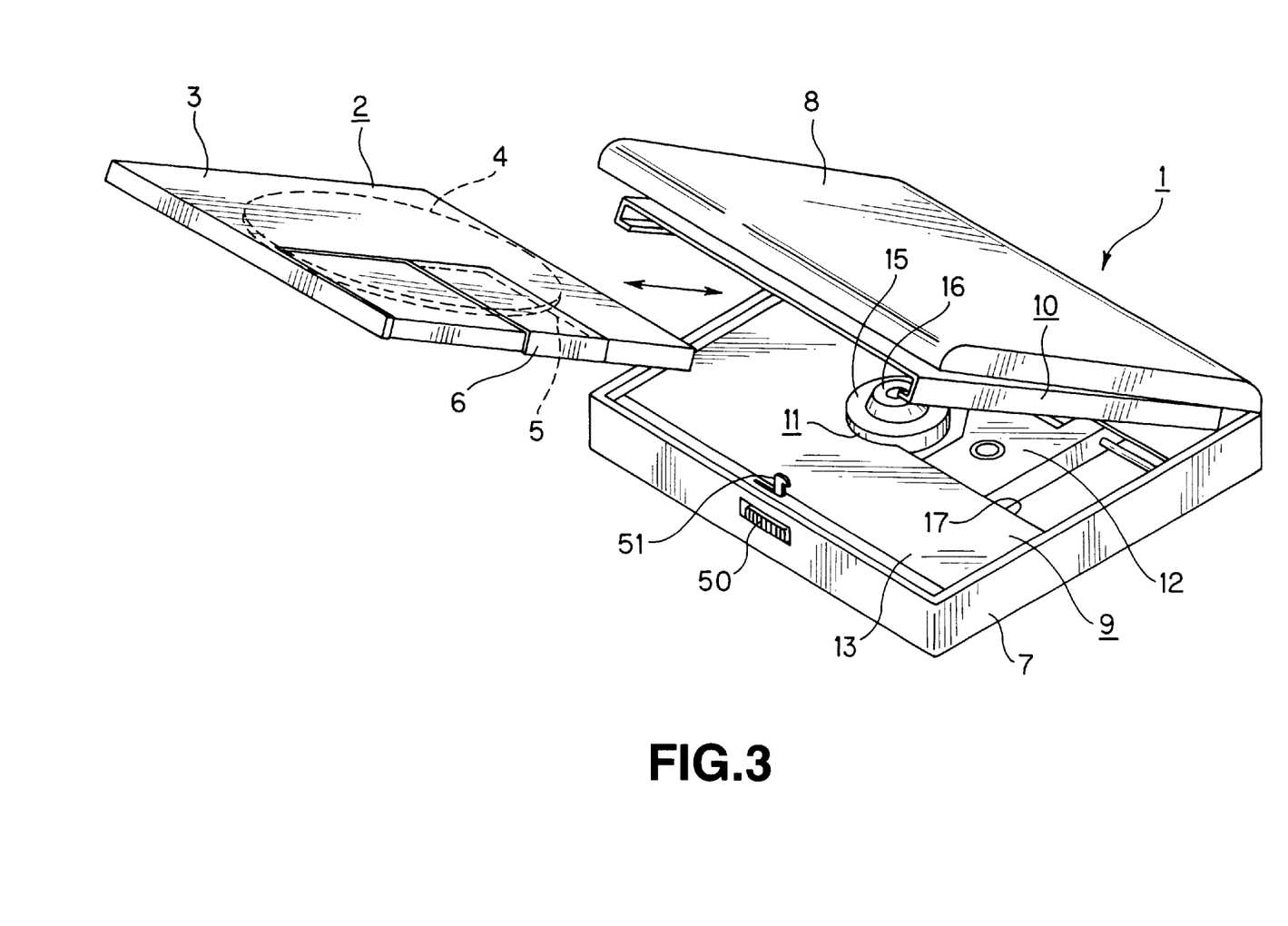
FIG. 3 is a perspective view showing the state where cover body is moved to opening position and disc cartridge.

A disc cartridge 2 used in the recording and/or reproducing apparatus for magneto-optical disc according to this invention is adapted as shown in FIG. 3 so that a magneto-optical disc 4 is rotatably accommodated within a cartridge case 3 which takes substantially rectangular flat box shape. At the cartridge case 3, there is formed, at the central portion of the lower surface, center hole (not shown) for allowing center hub (not shown) having magnetic member such as metal, etc. bonded to the central portion of the magneto-optical disc 4 to be exposed to the external. At the lower surface of the cartridge case 3, there is formed opening (not shown) for pick-up access for opposing information recording surface of the magneto-optical disc 4 to optical pick-up which will be described later and there is formed an opening 5 for head access for allowing magnetic head for overwrite which will be described later to be admitted into the cartridge case 3 to come into contact with the magneto-optical disc 4 at position corresponding to the opening for the pick-up access of the upper surface of the cartridge case 3. At the cartridge case 3, a shutter 6 for opening or closing the opening for pick-up access and the opening 5 for head access is attached slidably between position at which the opening for pick-up access and the opening 5 for head access are closed and position at which the opening for pick-up access and the opening 5 for head access are opened.

Figure 2:
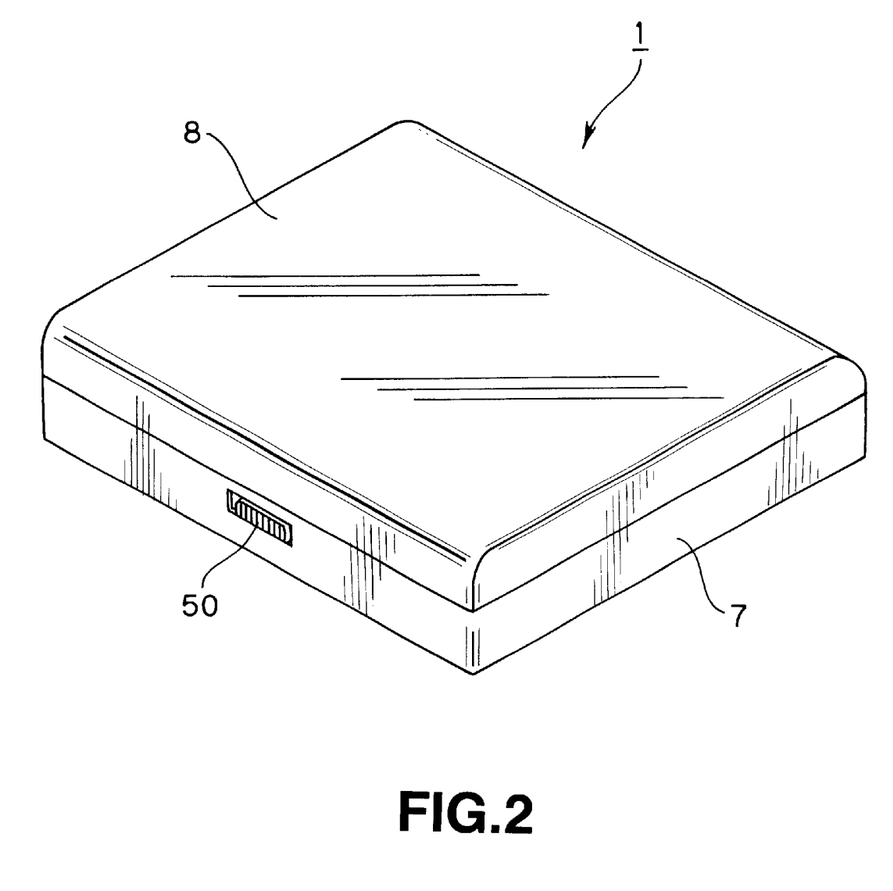
FIG. 2 is a perspective view showing the state where cover body is located at closed position in a recording and/or reproducing apparatus for magneto-optical disc according to this invention.

As shown in FIGS. 2 and 3, the recording and/or reproducing apparatus 1 for magneto-optical disc comprises a holder 10, which is moved between fitting position at which an apparatus body portion 9 and the disc cartridge 2 are held to affix the magneto-optical disc 4 at a predetermined disc fitting portion of the apparatus body portion 9 and eject position spaced from the disc fitting position to carry out insertion/withdrawal of the disc cartridge 2, within a casing composed of a thin box shaped body case 7 of which upper surface is opened and a cover body 8 rotatably provided at the body case 7 to open or close the upper surface of the body case 7.

As shown in FIG. 3, the apparatus body portion 9 is adapted so that a rotational drive portion 11 for rotationally driving the magneto-optical disc 4 and an optical pickup 12 for irradiating laser beams onto the information recording surface of the magneto-optical disc 4 to carry out reproduction and/or recording of information, etc. are provided on a chassis 13.

At the central portion of the chassis 13, a spindle motor 14 (FIG. 6) is supported. At the upper surface side of a rotor 15 of this spindle motor 14, a turn table 16 is provided. The magneto-optical disc 4 is mounted in such a manner that center hole provided at the central portion of the magneto-optical disc 4 is engaged with the turn table 16. By the spindle motor 14 and the turn table 16, the rotation drive portion 11 is constituted. In this example, permanent magnet is provided at the turn table 16. As the result of the fact that the center hub of the magneto-optical disc 4 accommodated within the disc cartridge 2 is attracted by the permanent magnet, the magneto-optical disc 4 is affixed on the turn table 16.

Figure 5:
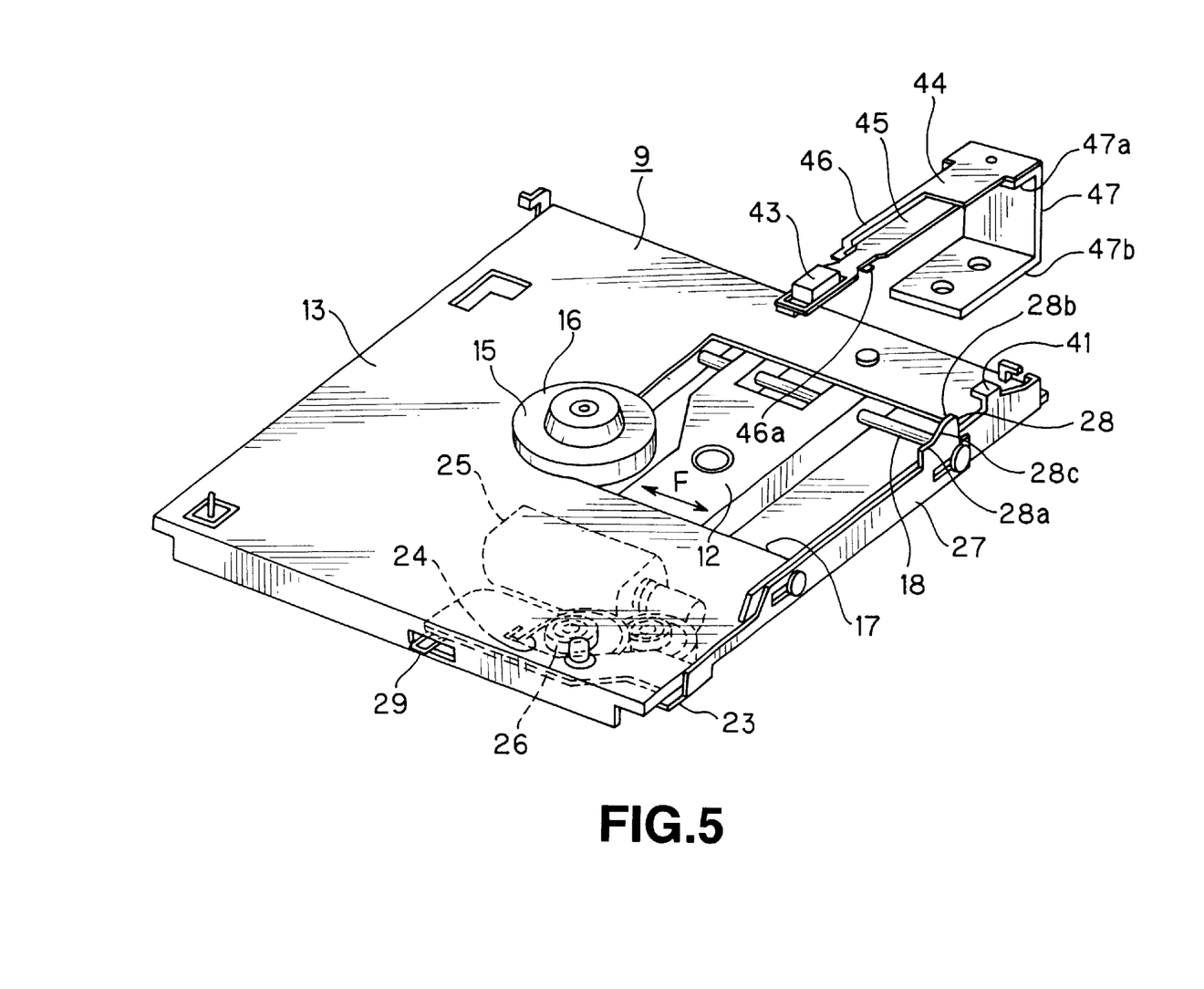
FIG. 5 is a perspective view showing outline of apparatus body portion.
Figure 6:
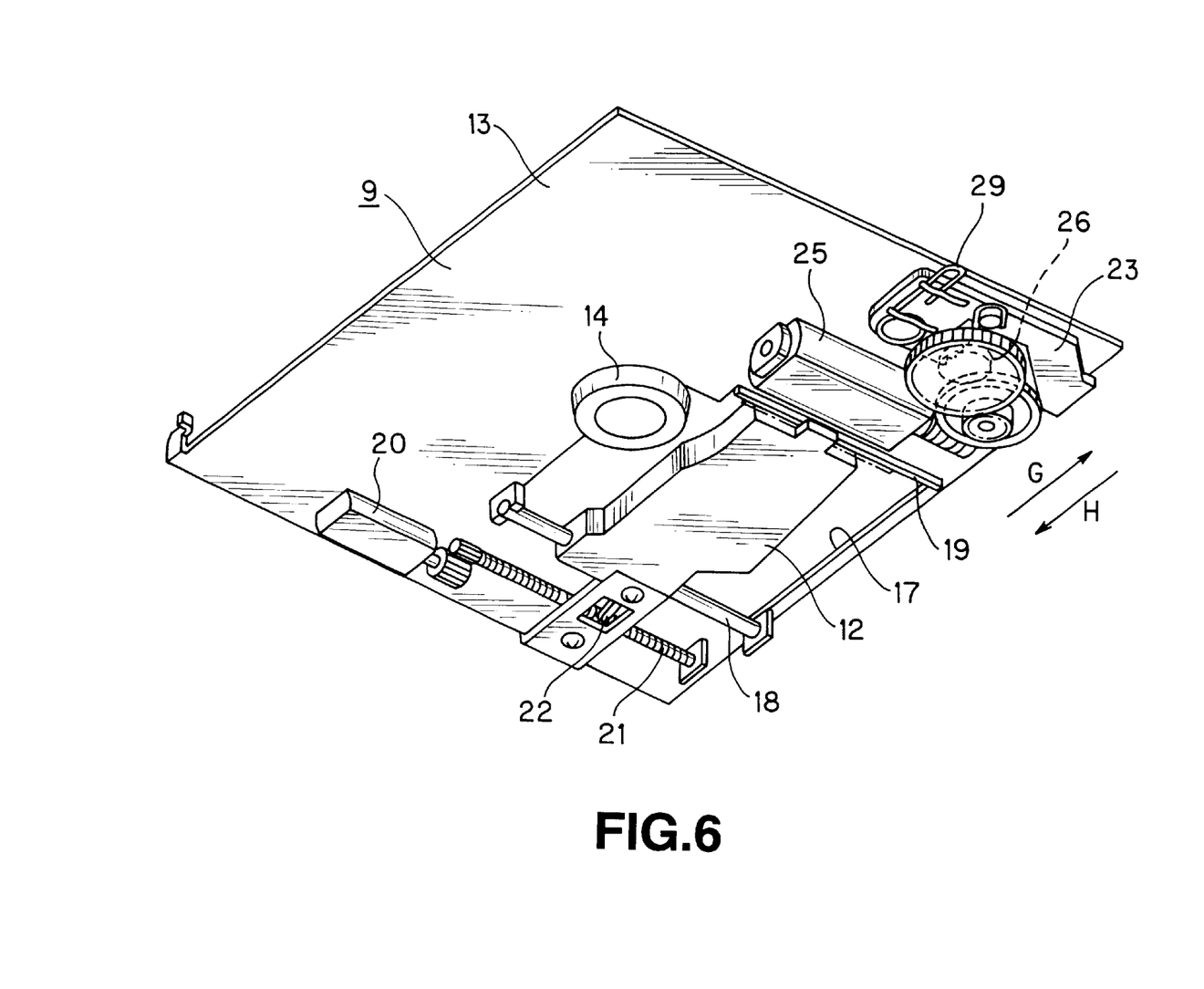
FIG. 6 is a perspective view showing the apparatus body portion from lower side.

At the chassis 13, there is formed a large opening portion 17 extending from the central portion where the rotation drive portion 11 is disposed toward one side edge. The optical pick-up 12 is disposed within the body case 7 in such a manner to face the upper portion from the opening portion 17, and the optical pick-up 12 is movable in direction to come into contact with the rotation drive portion 11 or become away therefrom, i.e., in the direction indicated by arrow F (in left and right directions) in FIG. 5. As shown in FIG. 6, the optical pick-up 12 is slidably supported by a guide shaft 18 and a guide portion 19 which are disposed at the lower surface of the chassis 13. In the optical pick-up 12, a nut member 22 provided at the optical pick-up 12 is engaged with a lead screw through which drive force from a sled motor 20 is transmitted through plural gears (toothed wheels). Accordingly, when the lead screw 21 is rotationally driven by the sled motor 20, the nut member 22 engaged with this lead screw 21 is fed in the axial direction of the lead screw 21. As a result, the optical pick-up 12 is moved in the direction indicated by arrow F in FIG. 5, i.e., in the radial direction of the magneto-optical disc 4.

At the lower surface of the chassis 13, a vertical movement control plate 23 is movably supported in forward and backward directions, i.e., in the direction indicated by arrow G (forward direction) and in the direction indicated by arrow H (backward direction) in FIG. 6. As shown in FIG. 5, at this vertical movement control plate 23, there is formed a rack 24. As the result of the fact that this rack 24 is moved by a pinion 26 rotated by a motor 25 provided at the lower surface of the chassis 13, the vertical movement control plate 23 is moved in forward and backward directions, i.e., in a direction perpendicular to the direction indicated by arrow F in FIGS. 4 and 5.

At the portion projected slightly in external direction from one side edge of the chassis 13 of the vertical movement control plate 23, there is formed a vertical movement lever portion 27 raised upwardly and extending in forward and backward directions, i.e., in directions perpendicular to the directions indicated by the above-described arrow F along the side surface of the chassis 13. At the back end portion of the vertical movement lever portion 27, there is formed a vertical movement cam portion 28 projected upwardly. At the vertical movement cam portion 28, a falling portion 28a of the front end portion and a rising portion 28b of the back end portion are connected by a slanting side portion 28c.

At the front end portion of the vertical movement control plate 23, an operation connection spring 29 is projected in such a manner that it is projected in the forward direction. In the case where the vertical movement control plate 23 is moved in the forward direction, i.e., in the direction indicated by arrow G shown in FIG. 6, the operation connection spring 29 is projected from the front surface of the chassis 13. Thus, there results the state where lock with respect to the closed position at which the upper surface of the body case 7 of the cover body 8 is covered can be released in linking with the lock mechanism of cover body 8 (not shown). Conversely, when the operation connection spring 29 is moved in the direction indicated by arrow H, linking between the operation connection spring 29 and lock mechanism of cover body 8 (not shown) is released to prohibit operation with respect to opening position of the cover body 8. In other words, the cover body 8 is held in locked state by the lock mechanism. At the cover body 8, engagement with respect to an engagement piece 51 constituting lock mechanism (not shown) is released by carrying out slide operation of a release operation portion 50. Thus, as shown in FIG. 3, the cover body 8 can be rotated to opening position at which the body case 7 is opened. The engagement piece 51 is biased in the direction to engage with engaged portion of the cover body 8 by biasing member (not shown).

Figure 4:
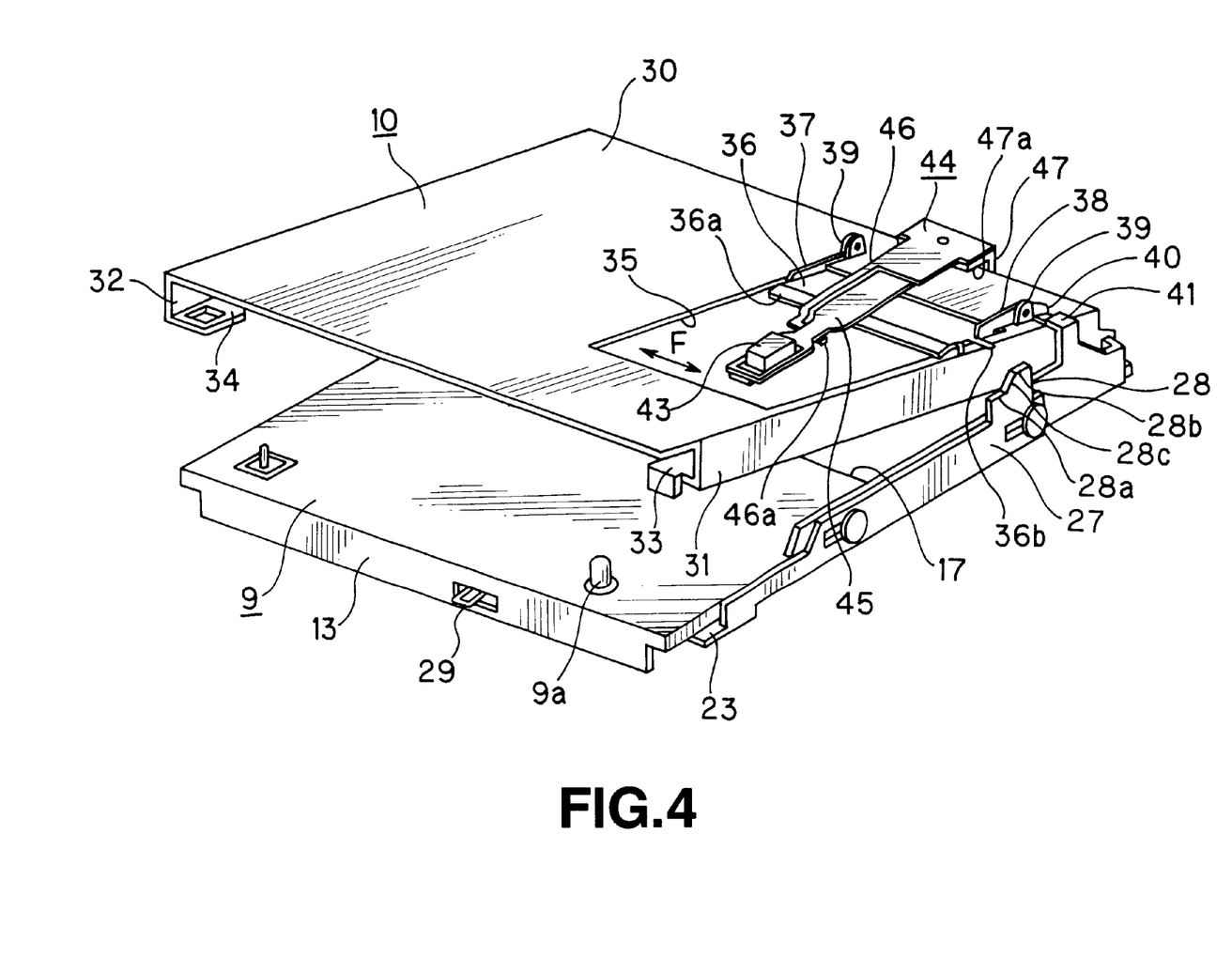
FIG. 4 is a perspective view showing outline of internal mechanism.

As shown in FIG. 4, at the holder 10, side surface plate portions 31, 32 are vertically provided from both side edges of a top plate portion 30, and receiving plate portions 33, 34 are projected from lower edges of these side surface plate portions 31, 32 toward the direction in which both portions are close to each other. The back end portion of such holder 10 is rotatably supported at the upper surface of the back end portion of the chassis 13. The disc cartridge 2 is inserted into a flat space of the holder 10 defined by the top plate portion 30, the side surface plate portions 31, 32 and the receiving plate portions 33, 34, and the inserted disc cartridge 2 is held by the top plate portion 30, the side surface plate portions 31, 32 and the receiving plate portions 33, 34.

At the top plate portion 30 of the holder 10, a large opening portion 35 is formed at the position corresponding to the opening portion 17 of the chassis 13.

The head shift plate 36 is rotatably supported in upper and lower directions in such a manner to project from the position close to the back edge of the opening portion 35 of the top plate portion 30 toward the opening portion 17. The head shift plate 36 is formed so that the lateral width is slightly narrower than the lateral width of the opening portion 35, and is formed so that the head shift plate 36 can be admitted into the opening portion 35. At the front end portion of the head shift plate 36, there is formed a projection-shaped contact portion 36a which is curved convex upwardly, and a driven piece 36b is projected from side edge of the head shift plate 36, i.e., side edge of side portion side where the vertical movement lever portion 27 is disposed. At the head shift plate 36, a spring contact piece 36c is projected from the side edge of the side where the driven piece 36b is projected.

From both side portions of the back end of the head shift plate 36, supported pieces 37, 38 are respectively projected toward the backward direction. One supported piece 37 is formed so that it is longer than the other supported piece 38, and the intermediate portion of the supported piece 37 and the back end portion of the supported piece 38 are rotatably supported by supporting pieces 39, 39 projected on the top plate portion 30 of the holder 10.

The supported piece 37 is formed substantially shaped such that the portion supported by the supporting piece 39 is caused to be point of bending when viewed from the side direction, and a hook piece 40 projected toward the side direction and formed crank-shaped when viewed from the front side is formed at the back end portion of this supporting piece 37. At the back end portion of the chassis 13, there is formed a regulating piece 41 projected toward the inside and positioned at the upper side of a lower side portion 40a of the hook piece 40 of the head shift plate 36.

Figure 7:
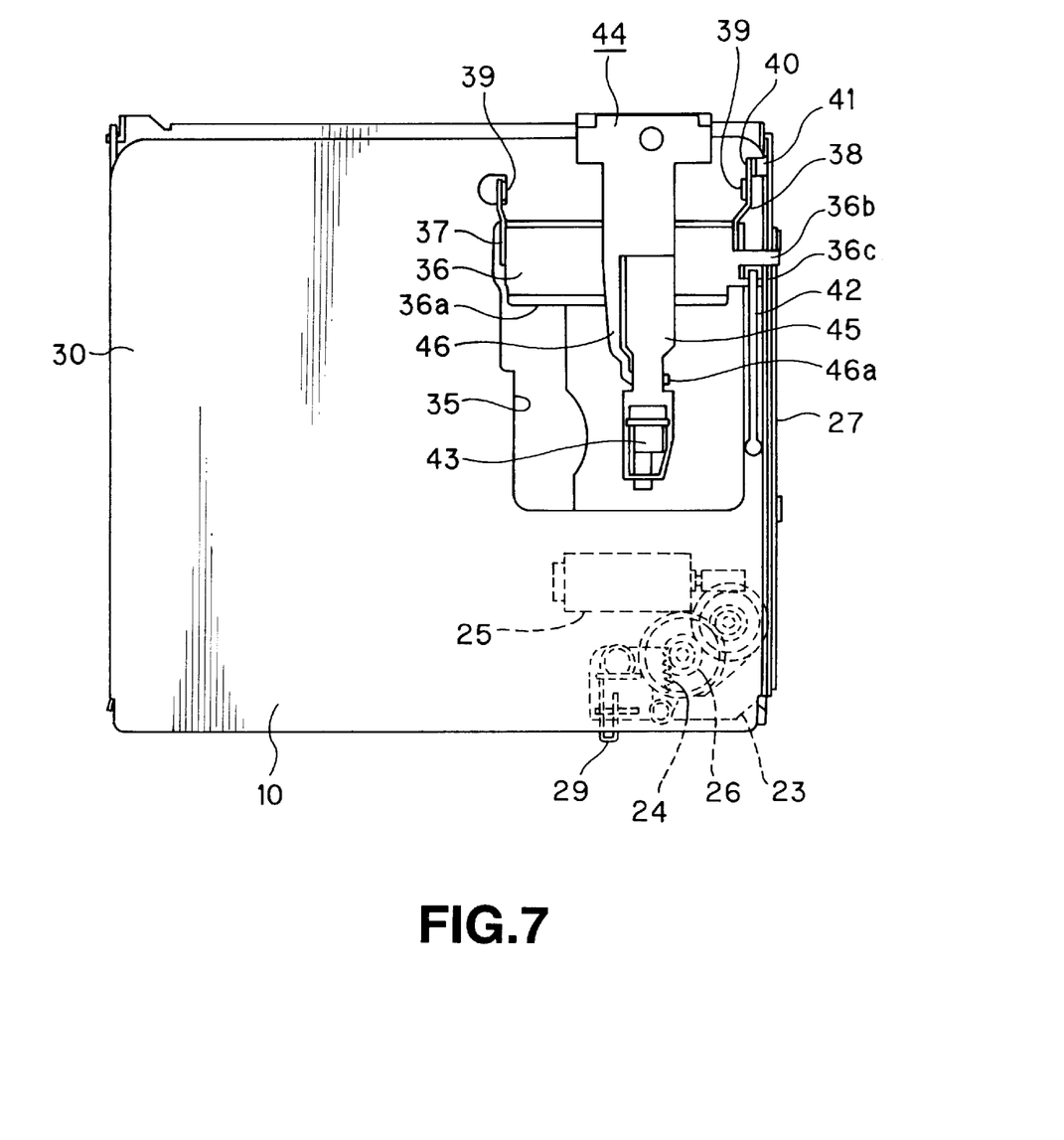
FIG. 7 is a plan view showing the internal mechanism.

As shown in FIG. 7, a return spring 42 formed by leaf spring material so as to take elongated plate shape in forward and backward directions is adapted so that its front end portion is fixed at the upper surface of the top plate portion 30 of the holder 10 and its back end portion is elastically in contact with spring contact piece 36c of the head shift plate 36 from the upper side. As a result, the head shift plate 36 is biased in a lower direction, i.e., in a direction to project into the holder 10 through the opening portion 35 by the return spring 42.

Figure 8:
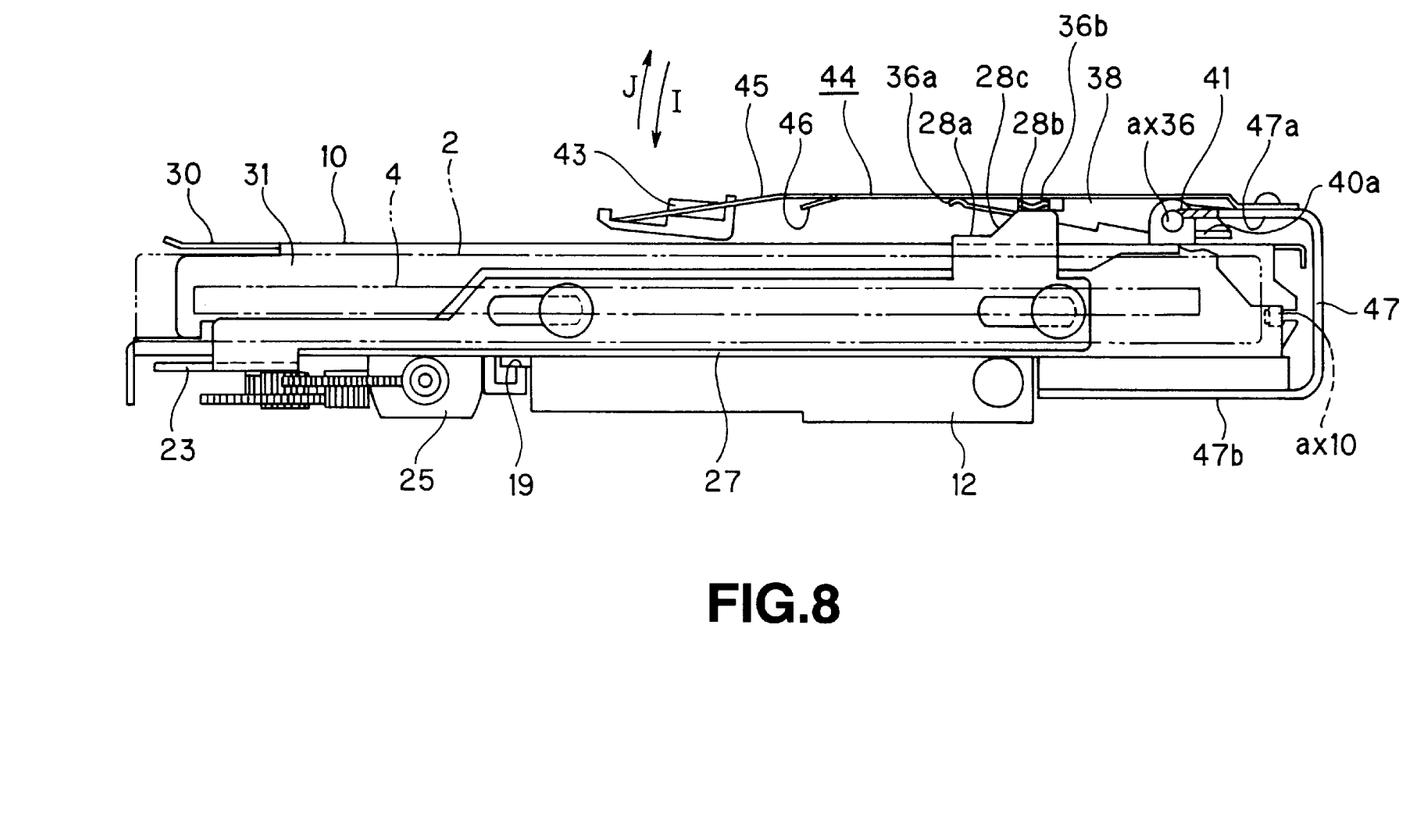
FIG. 8 is a side view showing the state except for recording state.

Respective positional relationship of rotational fulcrum portion ax10 of the holder, the regulating piece 41 and rotational fulcrum portion ax36 of the head shift plate 36 are as shown in FIG. 8. Namely, the rotational fulcrum ax36 of the head shift plate 36 is positioned at the front indicated by the direction indicated by arrow G in FIG. 6 relative to the rotational fulcrum ax10 of the holder 10, i.e., rotation free end side of the holder 10, and the restricting piece 41 is positioned at the intermediate position of these rotational fulcrum portions ax36 and ax10.

As shown in FIGS. 4 and 5, at the upper surface side of the top plate portion 30 of the holder 10, a magnetic head 43 for overwrite is movably disposed in the direction indicated by arrow F along with the optical pick-up 12.

A magnetic head unit 44 is provided at the front side thereof with a head supporting arm 45 which has supported the magnetic head 43, and an arm supporting plate 46 for regulating excessive displacement of this head supporting arm 45.

The head supporting arm 45 is formed by punching thin metal plate having elasticity, e.g., phosphor bronze, etc. An arm supporting plate 46 is adapted so that a front end portion 46a bent L-shaped supports the lower surface of the front end side of the head supporting arm 45, and base end portions of the arm supporting plate 46 and the head supporting arm 45 are both fixedly supported at an upper end portion 47a of a connection member 47 which is channel shaped in the side surface shape. A lower end portion 47b of the connecting member 47 is fixed on the lower surface of the optical pick-up 12.

The operation of the recording and/or reproducing apparatus 1 for magneto-optical disc constituted as described above will now be described.

The state shown in FIG. 2 is the state where the cover body 8 is closed at closed position, and the state of the time of stop, reproduction or recording. The cover body 8 is locked at closed position by lock mechanism (not shown). When the recording and/or reproducing apparatus 1 for magneto-optical disc is placed in stopped state, the operation connection spring 29 is projected in the direction indicated by arrow G in FIG. 6, and there results the state where engagement between the engagement piece 51 and the cover body 8 can be released by slide operation of the release operation portion 50. When the recording and/or reproducing apparatus 1 for magneto-optical disc is placed in at least recording state, the operation connection spring 29 is withdrawn in the direction indicated by arrow H in FIG. 6, and engagement between lock mechanism (not shown) and the operation connection spring 29 is released. Even if the release operation portion 50 is slid, operation is not transmitted to the engagement piece 51 so that the engagement piece 51 cannot be moved. Thus, the engagement state between the engagement piece 51 and the cover body 8 is maintained. As a result, the cover body 8 is held at closed position shown in FIG. 2.

Figure 10:
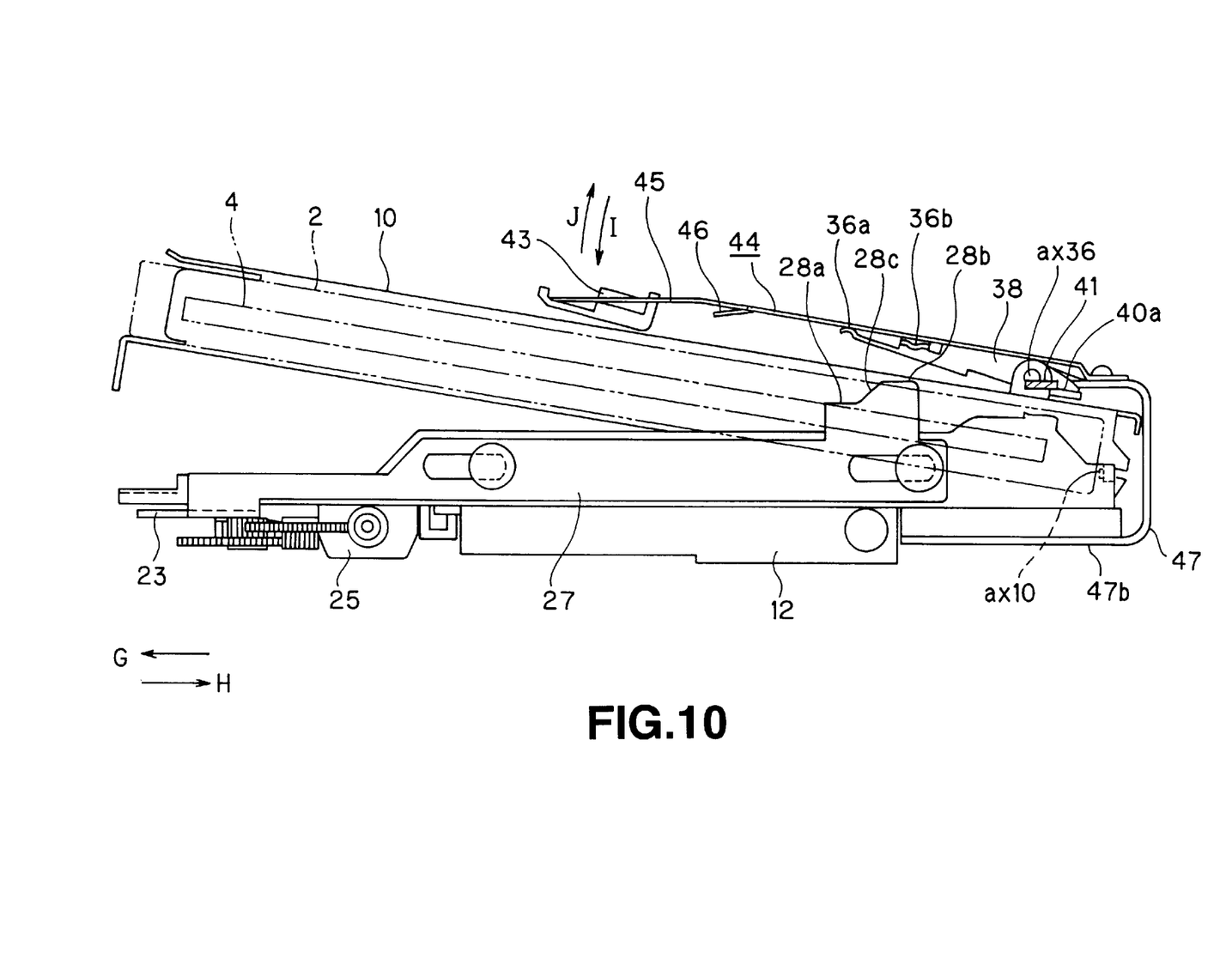
FIG. 10 is a side view showing eject state.

The state shown in FIG. 3 is the state where the cover body 8 is opened at opening position. When the cover body 8 is opened in this way, since the holder 10 is connected to the cover body 8, the holder 10 also rotates along with the cover body 8, resulting in the state where it is located at eject position where insertion/withdrawal of the disc cartridge 2 can be carried out. In the case where the recording and/or reproducing apparatus 1 for magneto-optical disc is caused to be in stopped state, or the disc cartridge 2 is inserted into the holder 10 when the recording and/or reproducing apparatus 1 for magneto-optical disc is in stopped state, when the release operation portion 50 is operated to release engagement state between the engagement piece 51 and the cover body 8 to allow user to raise the cover body 8 so that the holder 10 is reached to eject position shown in FIG. 3 or 10, a portion of the disc cartridge 2 inserted within the holder 10 is thrust or forced out from the holder 10 so that it is projected. Thus, user takes out, from the holder 10, the disc cartridge 2 in which recording and/or reproduction of information have been completed to newly insert, into the holder 10, other disc cartridge 2 for carrying out recording and/or reproduction of information. In the process where the disc cartridge 2 is inserted into the holder 10, the shutter 6 is moved to the opening position at which the opening for pick-up access and the opening 5 for head access are opened by shutter opening/closing mechanism (not shown) provided at the holder 10. As a result, the opening for pick-up access and the opening 5 for head access are opened. Thus, the magneto-optical disc 4 is faced toward the external through the opening for pick-up access and the opening 5 for head access.

When the cover body 8 is rotated toward the closed position, the holder 10 is located at fitting position and the cover body 8 is engaged with the engagement piece 51 constituting lock mechanism (not shown). As a result, the cover body 8 is locked at closed position and the disc cartridge 2 is caused to undergo positioning by positioning pin 9a of the apparatus body portion 9 so that it is fitted at a predetermined fitting position. At this time, as shown in FIG. 8, the magneto-optical disc 4 is fitted on the turn table 16. It is to be noted that, with respect to the positioning pin, another positioning pin is provided so as to pair the positioning pin 9a shown in FIG. 4, but illustration is omitted in view of avoidance of complexity of the drawing. In the state shown in FIG. 8, the vertical movement control plate 23 is located at the front end of the movement range as shown in FIG. 6, and the operation connection spring 29 is projected from the front end of the chassis 13 so that there results the state where lock with respect to the closed position of the cover body 8 can be released as previously described. Accordingly, the vertical movement lever portion 27 also reaches the front end of the movement range, i.e., the non-recording position. As a result, as shown in FIG. 8, there results the state where driven portion 36b of the head shift plate 36 is mounted on rising portion 28b of the vertical movement cam 28 and the head shift plate 36 is rotated upwardly. Thus, contact portion 36a of this head shift plate 36 pushes upwardly the arm supporting plate 46 and the head supporting arm 45. Accordingly, the magnetic head 43 is located at non-recording position spaced upwardly from the magneto-optical disc 4.

Figure 9:
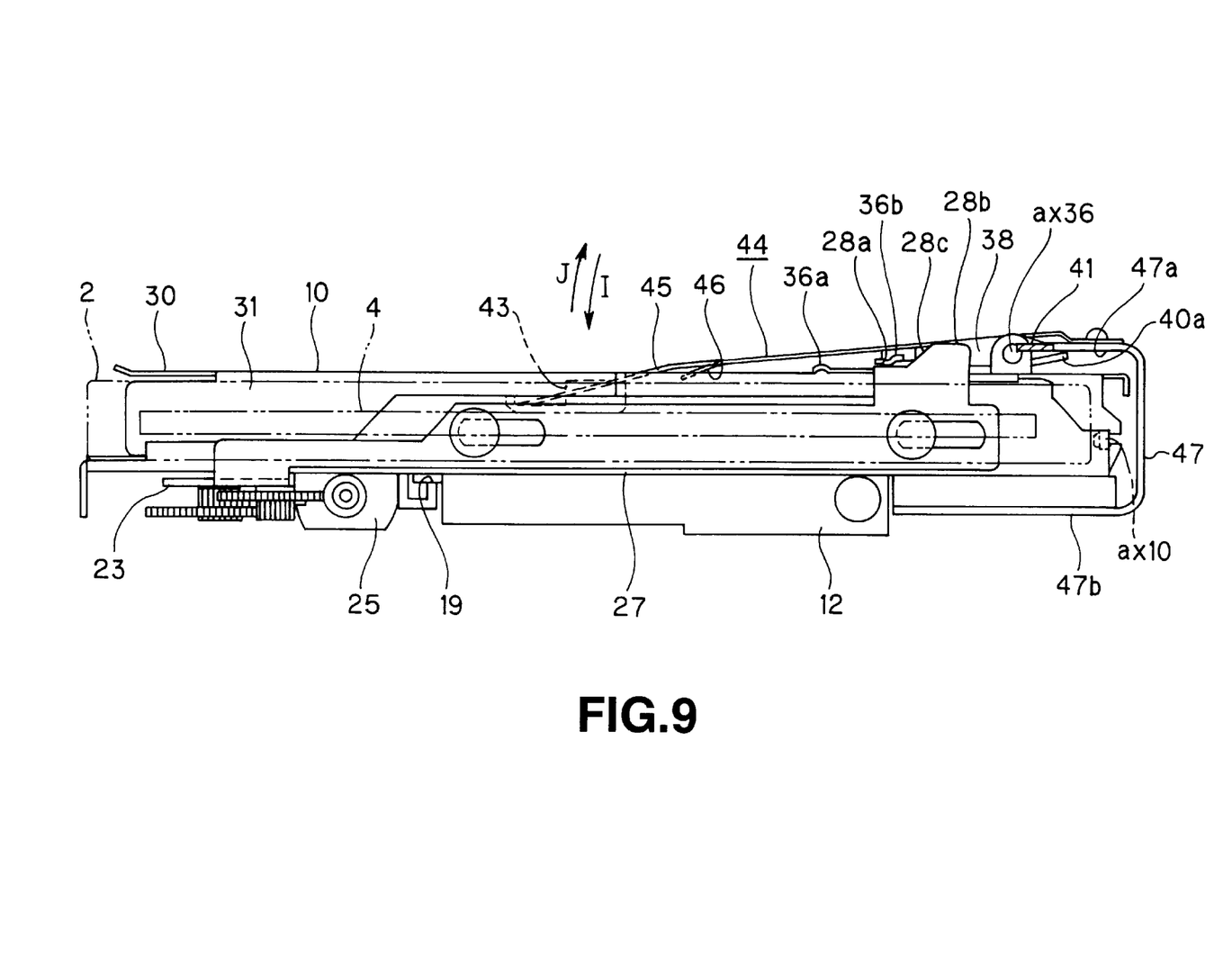
FIG. 9 is a side view showing the recording state.

In the case of carrying out reproduction with respect to the magneto-optical disc 4, as described above, reproduction operation, i.e., reading operation of information is carried out in the state where the magnetic head 43 is spaced from the magneto-optical disc 4. Namely, the magneto-optical disc 4 is rotated, e.g., at constant linear velocity by spindle motor 14, and there is carried out detection of reflected light obtained as the result of the fact that laser beams irradiated onto information recording surface of the magneto-optical disc 4 are reflected by the information recording surface while scanning point of the magneto-optical disc 4 by optical pick-up 12, i.e., spot by irradiated laser beams moves in the radial direction of the magneto-optical disc 4. Thus, reproduction of information with respect to this magneto-optical disc 4 is carried out. In the case of carrying out recording of information with respect to the magneto-optical disc 4, the vertical movement control plate 23 is moved backwardly, i.e., in the direction indicated by arrow H in FIG. 6 by motor 25. Thus, the operation connection spring 29 is moved backwardly, resulting in the state where lock with respect to closed position cannot be released as previously described. The vertical movement lever portion 27 is also moved as shown in FIG. 9, i.e., to the recording position. Thus, there results the state where driven portion 36b of the head shift plate 36 is mounted on falling portion 28a via slanting side portion 28c of the vertical movement cam portion 28. As a result, the arm supporting plate 46 and the head supporting arm 45 are rotated downwardly, i.e., in the direction indicated by arrow I in FIG. 9, and the magnetic head 43 comes into contact with position corresponding to the portion to which laser beams are irradiated by optical pick-up 12 of the upper surface of the magneto-optical disc 4 through the opening portion 35 and the opening 5 for head access, resulting in the state where the magnetic head 43 is rotated toward the recording position. In the state where this magnetic head 43 is slidably in contact with the upper surface, i.e., protective film of the magneto-optical disc 4, laser beams having output level higher than output level at the time of reproduction are irradiated by optical pick-up 12 onto information recording surface of the magneto-optical disc 4 and perpendicular magnetic field modulated on the basis of, e.g., recording signal recorded onto the magneto-optical disc 4 is applied to the magnet-optical disc 4 by the magnetic head 43. Thus, new information is recorded onto the information recording surface of the magneto-optical disc 4. Such recording of information is carried out while the optical pick-up 12 is moving in the radial direction of the magneto-optical disc 4. In this case, the magnetic head 43 is moved in the radial direction of the magneto-optical disc 4 along with the optical pick-up 12.

When recording of information with respect to the magneto-optical disc 4 is completed as the result of the fact that operation unit (not shown) is operated by user, etc., the motor 25 is driven. As a result, the vertical movement control plate 23 is moved in the forward direction, i.e., in the direction indicated by arrow G in FIG. 6, so the operation connection spring 29 is projected forward, resulting in the state where lock with respect to closed position of the cover body 8 can be released as previously described. At this time, since the vertical movement lever portion 27 is also moved forward as shown in FIG. 8, i.e., toward the non-recording position, rising portion 28b of the vertical movement cam portion 28 moves below driven piece 36b of the head shift plate 36. Thus, the head shift plate 36 is rotated upwardly, i.e., in the direction indicated by arrow J in FIG. 9. As a result, contact portion 36a of this head shift plate 36 pushes upwardly the arm supporting plate 46 and the head supporting arm 45. Accordingly, the magnetic head 43 supported at the front end portion of the head supporting arm 45 is moved upwardly so that it is spaced from the magneto-optical disc 4.

When the release operation portion 50 is caused to undergo slide operation to release engagement between engagement piece 51 and cover body 8 to thereby release lock at the closed position with respect to the cover body 8 to move it to the opening position as shown in FIG. 3, it is rotated upwardly toward the eject position of the holder 10 along with the cover body 8 and a portion of the disc cartridge 2 is placed in the state projected from the holder 10. In this state, user can pick up, by fingers, etc., a portion projected from the holder 10 to take out the disc cartridge 2 from the holder 10. The shutter 6 which was located at opening position when the disc cartridge 2 is taken out from the holder 10 is moved to closed position at which the opening for pick-up access and the opening 5 for head access are closed by shutter opening/closing mechanism (not shown) provided at the holder 10.

The head shift plate 36 is also moved along with the holder 10 by rotation with respect to eject position of the holder 10, but the regulating piece 41 provided at the chassis 13 comes into contact with lower side portion 40a of the hook piece 40 of the head shift plate 36 from the upper direction. Accordingly, for a time period during which the holder 10 is rotated up to the eject position, the head shift plate 36 is relatively upwardly moved with respect to the holder 10. Thus, there is maintained (held) the state where magnetic head 43 is spaced from the magneto-optical disc 4.

As described above, as the mechanism for maintaining the state where the magnetic head 43 is spaced from the magneto-optical disc 4 when the holder 10 is rotated toward the eject position along with cover body 8, there may be employed, in addition to the above-described configuration, e.g., a mechanism such that a shelter portion located at position higher than rising portion 28b is formed at vertical movement cam portion 28 of vertical movement lever portion 27, whereby when the holder 10 is caused to be rotated toward eject position, driven piece 36b of the head shift plate 36 is mounted on the shelter portion. In addition, there may be employed a mechanism such that engagement portions to be engaged with each other are provided between the cover body 8 and the head shift plate 36, whereby when the cover body 8 is moved toward the opening position, the head shift plate 36 is pulled up by engagement of the engagement portions.

In the above-described recording and/or reproducing apparatus 1 for magneto-optical disc, the head shift plate 36 is directly moved by vertical movement lever portion 27 moved between the recording position and the non-recording position to allow the magnetic head 43 to be in contact with the magneto-optical disc 4 or become away therefrom. Accordingly, the number of parts is decreased and the number of steps followed thereby is decreased. Thus, this contributes to reduction in cost, and the number of linking portions between parts is reduced. As a result, accuracy in assembly can be maintained. Thus, reliability is improved. Further, in accordance with the recording and/or reproducing apparatus 1 for magneto-optical disc, the arrangement relationship between point of force and point of application becomes close to ideal one. As a result, loss torque based on peculiar moment is decreased. Thus, miniaturization or small power of drive source, i.e., motor can be realized.

Furthermore, in accordance with the recording and/or reproducing apparatus 1 for magneto-optical disc, since creeping of many linking members becomes unnecessary, there is margin for arrangement of other members and such members can be disposed at suitable portions. Thus, reliability can be improved and miniaturization can be realized.

While the recording and/or reproducing apparatus using, as recording medium, medium adapted so that magneto-optical disc is accommodated within the disc cartridge is illustrated in the above-described example, this invention can be applied to other recording and/or reproducing apparatus for magneto-optical disc using magneto-optical disc alone without use of disc cartridge.

It is to be noted that while shapes and structures of respective portions shown in the above-described embodiment are all illustrated as a merely one example of embodiment in carrying out this invention, it is believed that the technical range of this invention should not be restrictively interpreted by such embodiment.

INDUSTRIAL APPLICABILITY

As described above, in accordance with this invention, the number of parts is decreased and creeping of long distance of plural members becomes unnecessary. Thus, cost is reduced and reliability is improved. In addition, space merit is increased.

What is claimed is:

1. A recording and/or reproducing apparatus for a magneto-optical disc comprising:
   a body unit including a rotation drive portion for rotationally driving at least a magneto-optical disc and an optical pick-up for irradiating laser beams onto the magneto-optical disc rotated by the rotation drive portion;
   a holder moved between upper position at which the magneto-optical disc is inserted and lower position at which the inserted magneto-optical disc is held to attach it at the rotation drive portion;
   a magnetic head for supplying external magnetic field to the magneto-optical disc;
   a head supporting mechanism including a supporting member disposed above the holder in such a manner to oppose the optical pick-up and provided at one side with the magnetic head, thus to move the supporting member between recording position at which the magnetic head supplies external magnetic field to the magnet-optical disc held by the holder and non-recording position above the recording position and at which the magnetic head is spaced with respect to the magneto-optical disc; and
   a movement mechanism including a movement member movably disposed at the side surface of the body unit so that it is moved between a first position at which the head supporting mechanism is driven at the time of recording with respect to the magneto-optical disc to move the magnetic head to the recording position and a second position at which the head supporting mechanism is driven at the time of reproduction of the magneto-optical disc to move the magnetic head to the non-recording position.

2. The recording and/or reproducing apparatus for magneto-optical disc as set forth in claim 1, wherein the movement member comprises a cam portion for driving the head supporting mechanism.

3. The recording and/or reproducing apparatus for magneto-optical disc as set forth in claim 2, wherein the cam portion comprises a first portion for driving the head supporting mechanism to move the magnetic head to the non-recording position and a second portion for driving the head supporting mechanism to move the magnetic head to the recording position.

4. The recording and/or reproducing apparatus for magneto-optical disc as set forth in claim 3, wherein the movement mechanism comprises a movement operation portion for allowing the movement member to undergo movement operation to the first position and the second position.

5. The recording and/or reproducing apparatus for magneto-optical disc as set forth in claim 2, wherein the head supporting mechanism comprises a vertical movement operation portion provided at the holder and for moving the supporting member by the cam portion between recording position at which the magnetic head supplies perpendicular magnetic field to the magneto-optical disc held by the holder and non-recording position above the recording position and at which the magnetic head is spaced with respect to the magneto-optical disc.

6. The recording and/or reproducing apparatus for magneto-optical disc as set forth in claim 1, wherein the apparatus further comprises a restriction mechanism for restricting movement in a direction of the recording position of the magnetic head when the holder is located at the upper position.

7. The recording and/or reproducing apparatus for magneto-optical disc as set forth in claim 6, wherein the head supporting mechanism comprises a vertical movement operation portion provided at the holder and for moving the supporting member between recording position at which the magnetic head supplies perpendicular magnetic field to the magneto-optical disc held by the holder and non-recording position above the recording position and at which the magnetic head is spaced with respect to the magneto-optical disc.

8. The recording and/or reproducing apparatus for magneto-optical disc as set forth in claim 7, wherein the holder is rotatably provided at the body unit, the vertical movement operation portion is rotatably provided at the holder, fulcrum of rotation of the vertical movement operation portion is positioned at rotation free end side of the holder relative to fulcrum of rotation of the holder, and the restriction mechanism is composed of a restricted portion provided at the vertical movement operation portion and projected toward opposite side with respect to rotation free end of the holder relative to fulcrum of rotation of the vertical movement operation portion and a restricting portion provided at the body unit and adapted to engage the restricted portion when the holder is moved to the upper position.

9. A recording and/or reproducing apparatus for a magneto-optical disc comprising:

- a body unit including a rotation drive portion for rotationally driving at least the magneto-optical disc and an optical pick-up for irradiating laser beams onto the magneto-optical disc rotated by the rotation drive portion;
- a holder rotatably provided at the body unit between upper position at which the magneto-optical disc is inserted and lower position at which the inserted magneto-optical disc is held to attach it at the rotation drive portion;
- a magnetic head for supplying external magnetic field to the magneto-optical disc;
- a head supporting mechanism including a supporting member disposed above the holder in such a manner to oppose the optical pick-up and provided at one end side with the magnetic head to move the supporting member between recording position at which the magnetic head supplies external magnetic field to the magneto-optical disc held by the holder and non-recording position above the recording position and at which the magnetic head is spaced with respect to the magneto-optical disc; and
- a movement mechanism including a movement member movably disposed at the side surface of the body unit so that it is moved between a first position at which the head supporting mechanism is driven at the time of recording with respect to the magneto-optical disc to move the magnetic head to the recording position and a second position at which the head supporting mechanism is driven when the holder is moved toward the upper position to move the magnetic head to the non-recording position.

10. The recording and/or reproducing apparatus for magneto-optical disc as set forth in claim 9, wherein the movement member comprises a cam portion for driving the head supporting mechanism.

11. The recording and/or reproducing apparatus for magneto-optical disc as set forth in claim 10, wherein the cam portion comprises a first portion for driving the head supporting mechanism to move the magnetic head to the non-recording position and a second portion for driving the head supporting mechanism to move the magnetic head to the recording position.

12. The recording and/or reproducing apparatus for magneto-optical disc as set forth in claim 11, wherein the movement mechanism comprises a movement operation portion caused to undergo movement operation to the first position and the second position.

13. The recording and/or reproducing apparatus for magneto-optical disc as set forth in claim 12, wherein the apparatus further comprises a cover body rotated along with the holder between opening position for opening the body unit and closing position for closing the body unit, whereby the cover body is adapted so that rotation with respect to the opening position is prohibited when the movement member is moved to the first position by the movement operation portion.

14. The recording and/or reproducing apparatus for magneto-optical disc as set forth in claim 10, wherein the head supporting mechanism comprises a vertical movement operation portion provided at the holder and for moving the supporting member by the cam portion between recording position at which the magnetic head supples perpendicular magnetic field to the magneto-optical disc held by the holder and non-recording position above the recording position and at which the magnetic head is spaced with respect to the magneto-optical disc.

15. The recording and/or reproducing apparatus for magneto-optical disc as set forth in claim 9, wherein the apparatus further comprises a restriction mechanism for restricting movement in a direction of the recording position of the magnetic head when the holder is located at the upper position.

16. The recording and/or reproducing apparatus for magneto-optical disc as set forth in claim 9, wherein the head supporting mechanism comprises a vertical movement operation portion rotatably provided at the holder to allow the supporting member to undergo rotational movement between recording position at which the magnetic head supplies perpendicular magnetic field to the magneto-optical disc held by the holder and non-recording position above the recording position and at which the magnetic head is spaced with respect to the magneto-optical disc.

17. The recording and/or reproducing apparatus for magneto-optical disc as set forth in claim 16, wherein fulcrum of rotation of the vertical movement operation portion is positioned at rotation free end side of the holder relative to fulcrum of rotation of the holder, and the restriction mechanism is composed of a restricted portion provided at the vertical movement operation portion and projected toward the opposite side with respect to rotation free end of the holder relative to fulcrum of rotation of the vertical movement operation portion, and a restricting portion provided at the body unit and adapted to engaged the restricted portion when the holder is moved to the upper position.

* * * * *